Aug. 28, 1923.
W. B. EDRINGTON
1,465,974
COTTON PICKING MACHINE
Filed Jan. 17, 1921
3 Sheets-Sheet 1
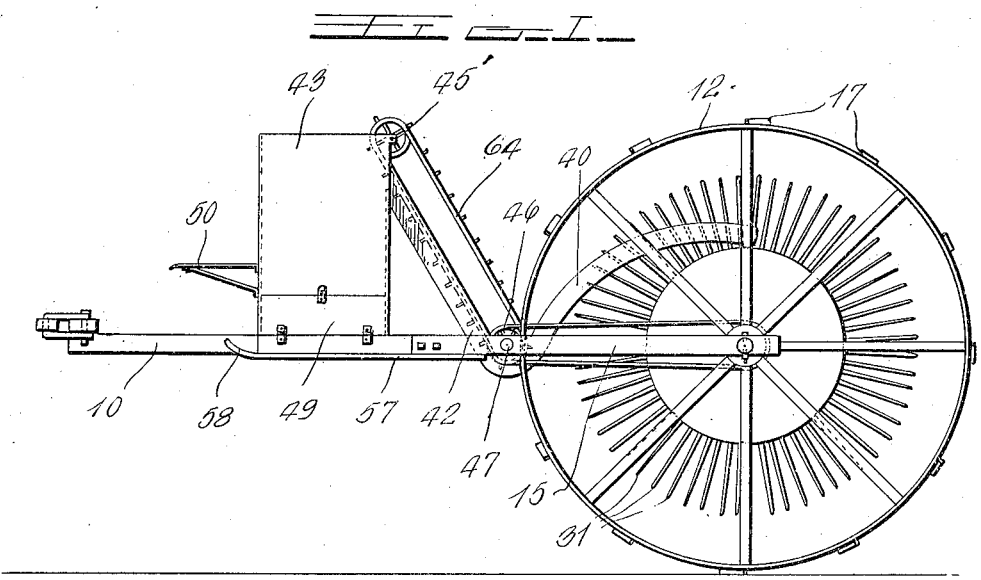
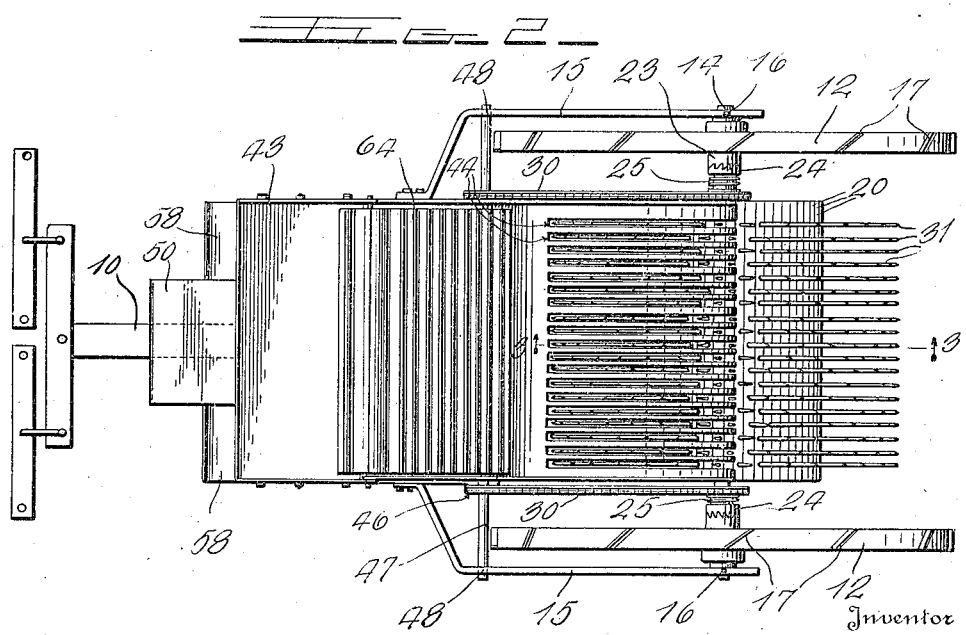
Inventor
W. B. Edrington
By Knight Bros.
Attorneys Aug. 28, 1923.  W. B. EDRINGTON  1,465,974
COTTON PICKING MACHINE
Filed Jan. 17, 1921  3 Sheets-Sheet 2
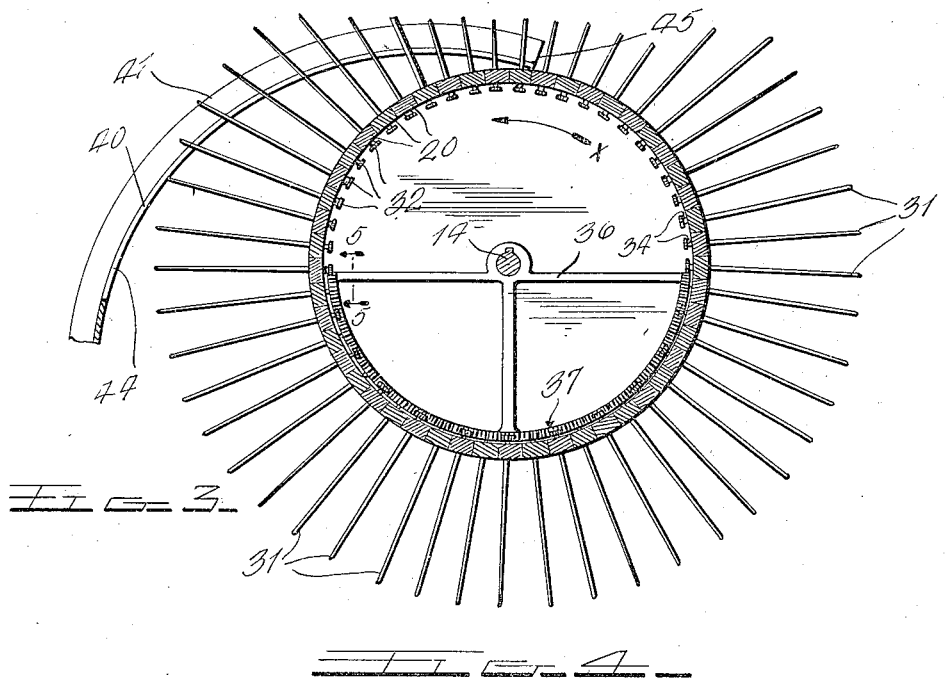
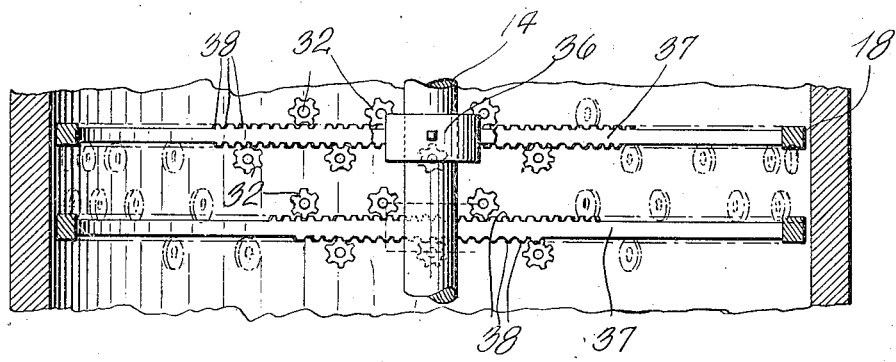
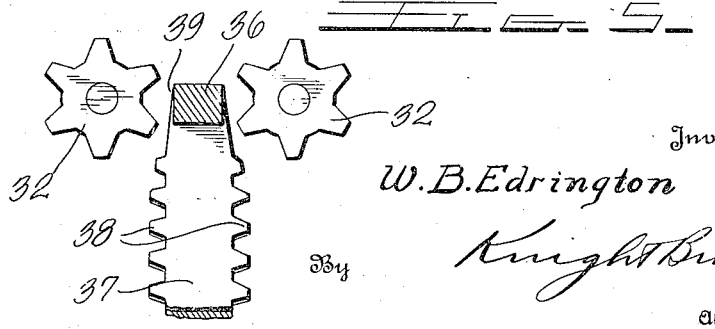
Inventor
W. B. Edrington
By Knight Bros.
Attorney

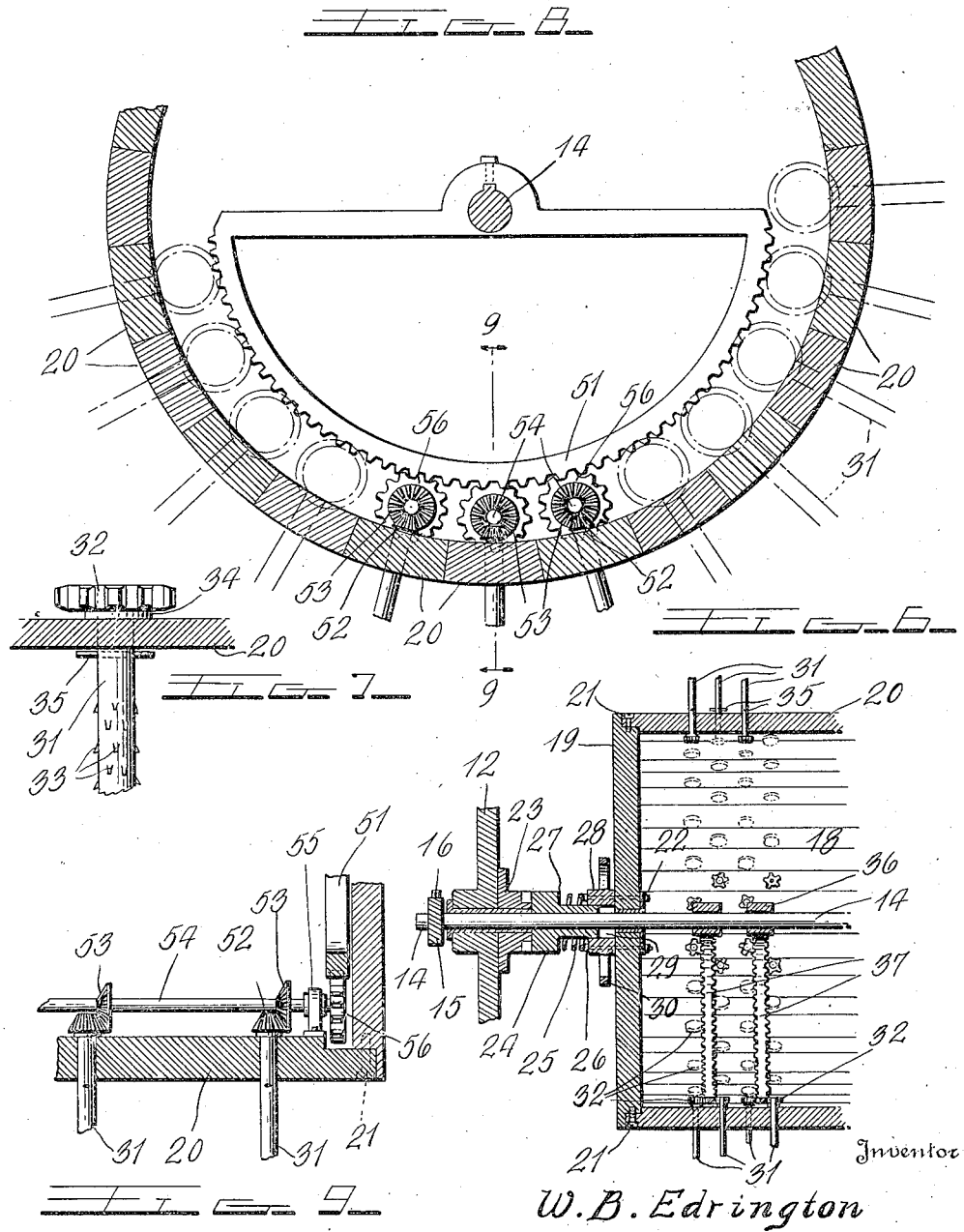

Patented Aug. 28, 1923.

1,465,974

UNITED STATES PATENT OFFICE.

WILLIAM B. EDRINGTON, OF HOLLYWOOD, MISSISSIPPI.

COTTON-PICKING MACHINE.

Application filed January 17, 1921. Serial No. 437,912.

*To all whom it may concern:*

Be it known that I, WILLIAM B. EDRINGTON, a citizen of the United States, and a resident of Hollywood, in the county of Tunica and State of Mississippi, have invented certain new and useful Improvements in a Cotton-Picking Machine, of which the following is a specification.

My invention relates to cotton picking machines, and particularly to a wheeled mobile machine adapted to be drawn along the ground and over the rows of cotton plants, the mechanism being so arranged that the cotton fiber is stripped from the cotton bolls and thereafter deposited in a receptacle.

One of the objects of this invention is to provide a machine which will efficiently free the cotton fiber from the plants without unnecessary injury thereto and without accumulating foreign matter in the gathered cotton. With machines generally employed, the members which are designed for stripping the fiber from the bolls either gather a large amount of leaves and foreign matter or else fail to completely free the cotton fibers from the bolls.

In carrying out my invention, I provide a multiplicity of spindles projecting radially from a drum, the surface of these spindles being serrated or roughened. As the machine passes over the cotton plants these spindles are caused to contact with the cotton bolls and during this contact to free the cotton fiber therefrom. The drum carrying the multiplicity of spindles is caused to rotate so as to constantly cause new spindles to contact with the cotton plants. Inasmuch as the cotton clings with more tenacity to a rotating spindle, I have so arranged the spindles on the drum that they rotate at a relatively high speed while in contact with the cotton plant, thus assuring the complete stripping of the cotton fibers from the bolls. During the stripping process and because of the rotary movement of the spindles, the cotton fiber is wrapped around these spindles.

As the spindles are moved out of contact with the cotton plants, the rotation of the spindles cease. These spindles are thereafter caused to pass through a stripping plate arranged with a series of longitudinal slots, one slot for each circumferential row of spindles. Because the spindles are now idle, the cotton is more easily removed therefrom by this stripping plate and as the spindles leave the stripping plate they have again imparted to them the rotary motion necessary for the efficient gathering of the cotton fiber.

From the stripping plate the cotton is conveyed to a receptacle from which when a sufficient amount has been gathered, the cotton may be discharged.

The invention will be more particularly described and many features made apparent from the accompanying specification and drawings in which:

Figure 1 is a side elevation of a cotton picking machine constructed in accordance with my invention, Figure 2 is a top plan view of the structure illustrated in Figure 1, Figure 3 is a transverse section of the picker drum on an enlarged scale, Figure 4 is an enlarged fragmentary horizontal sectional view, Figure 5 is a fragmentary detailed view of the spindle operating means, Figure 6 is a fragmentary vertical sectional view of the picker drum, Figure 7 is a detailed view of one of the spindles, Figure 8 is an enlarged fragmentary longitudinal sectional view of a modified form of my invention, and Figure 9 is a detailed fragmentary sectional view of the structure illustrated in Figure 8.

The frame of the machine is indicated by the numeral 10 and is provided with a pair of tractor wheels 12. The traction wheels 12 are mounted for rotation on an axle or shaft 14 extending transversely of the frame 10 and having its ends secured in extensions 15 projecting laterally and rearwardly from the frame 10. The axle 14 is prevented from rotating by pins 16 which project through the free ends of the extensions 15 and through the ends of the axle 14. The traction wheels are provided with traction projections 17. A picker drum 18 is mounted for rotation upon the axle 14. This drum is formed with two circular end plates 19 and a multiplicity of longitudinally disposed strips 20. These strips are removably secured at each end to the end plates by bolts 21, for a reason to be more fully hereinafter set forth. Bushings 22 fixed centrally of the end plates 19 form the bearing between the drum 18 and the axle 14.

The drum 18 is coupled to the traction wheels 12 so as to rotate therewith and this coupling may be accomplished in any suitable manner such as a manually operated or slip clutch. In the structure illustrated, I have shown a slip clutch comprising a clutch member 23 fixed rigidly to the inner side with each of the tractor wheels and a slidable clutch member 24 held in contact with the clutch member 23 by a spring 25. The spring 25 surrounds an extension 26 of the clutch member 24 and bears against a shoulder 27 formed thereon. The other end of the spring abuts the body of a sprocket wheel 28 fixed to each of the end plates 19 of the drum. The body of each of the sprocket wheels is provided with a square recess 29 adapted to receive the end of the extension 26 which is also correspondingly squared. From this it will be seen that while the spring 25 holds the clutch members 23 and 24, in engagement, rotary motion will be imparted to the drum through these clutch members, the extension 26 and the sprocket wheel 28. The drum, therefore, will rotate at the same speed as the tractor wheels. The contacting faces of the clutch members are so arranged that should the tractor wheels be rotated in the opposite direction the movable clutch member 24 will be moved against the tension of the spring 25 and the clutch disconnected and the drum allowed to remain idle. The sprocket wheel 28 is provided with sprocket teeth to engage a sprocket chain 30 for a purpose to be more fully set forth.

Rotatably supported in each longitudinal strip 20 of the drum 18 is a multiplicity of picker spindles 31. These spindles project through the strips 20 and at one end thereof carry pinions 32. The pinions 32 are spaced at such a distance from the face of the strips 20 that when these strips are in position upon the drum, these pinions lie inside the drum, adjacent the inner surface thereof. The portion of the spindles projecting from the other face of the strips are provided with projections 33 adapted to engage the cotton fibers to strip the same from the bolls in a manner to be more fully hereinafter set forth. The proper spacing of the pinion 22 from the inner face of the strips 20 may be insured by the use of washers 34, while the spindles may be secured against longitudinal displacement by pins 35.

The spindles are positioned along the strips 20 at equi-distant points, the longitudinal positions of the spindles on every other strip being staggered with respect to the adjacent strip so that when the several strips 20 carrying its series of spindles, are in position upon the picker drum, the spindles are arranged in circumferential rows spaced comparatively close together.

Rigidly secured to the axle or shaft 14 are a multiplicity of spindle operating members 36 disposed in a plane below the center of the shaft 14. These spindle operating members are formed with segmental rack bars 37 provided with teeth 38 on both sides thereof. These spindle operating members are disposed at points on the shaft 14 so that each rack bar 37 will lie between two circumferential rows of pinions 32. This structure is clearly illustrated in Figures 3 and 4. The ends of the rack bar 37 are tapered as illustrated at 39 in Figure 5 to facilitate the engagement of the pinions 32 therewith. It is obvious therefore, as the drum 18 is rotated, the pinions 32 are brought into engagement with the rack bars 37 thereby causing a rotation of the spindles during the lower half of their circumferential course. This rotation of the spindles occurs while they are in contact with the cotton plants.

Disposed at a point forward of the picker drum is a segmental stripping plate 40, curved on a radius somewhat larger than that of the stripper drum. The forward end of the stripper plate 40 is positioned adjacent the surface of the drum and at the top thereof as clearly illustrated in Figures 1 and 2. The stripper plate 40 is of sufficient width to extend the entire length of the picker drum and has upturned sides 41 for retaining the cotton fiber thereon. The rear end of this stripper plate terminates adjacent the lower end of a conveyor trough 42. This conveyor trough is extended upwardly and forwardly to a hopper or receptacle 43 on the frame 10 of the machine.

The stripper plate is provided with a multiplicity of longitudinal slots 44 extending from the rear edge 45' to a point adjacent its forward side. There is provided a slot 44 for each circumferential row of spindles 31. Therefore the shape of the stripper plate is such that as the drum carrying with it the spindles 31 rotates in the direction of the arrow $x$, (see Figure 3), the spindles will enter the slots at points adjacent the outer face of the drum and upon continued rotation will be gradually moved through the slots and withdrawn therefrom. This action causes the cotton fiber to be stripped from the spindles and dropped to the base of the trough 42. For conveying the cotton fiber deposited at the base of the trough 42 to the hopper 43, I provide an endless conveyor belt 64 which passes over pulleys 45 and 46 arranged at the upper and lower ends of the trough respectively. The pulley 46 is mounted on a shaft 47 which extends transversely of the machine and is journaled as at 48 in the frame extensions 15. This shaft carries sprocket wheels which are adapted to engage the sprocket chains 30, which chains also engage the sprocket wheels 28 rigidly fixed to the drum 18. Therefore the conveyor belt 64 is actuated to convey the cotton to the hopper 43. The hopper 43 is provided with discharge openings near the bottom thereof which are closed by suitable doors 49. The top slide of the hopper or receptacle 43 is preferably left open to enable the driver to keep the cotton packed in the receptacle. For convenience, a suitable seat 50 is secured to the side of the hopper from which seat the driver may manage his team and at the same time be in a position to pack the cotton in the hopper when the need arises and to discharge the contents by opening the doors 49.

Secured to the under side of the frame 10 and extending the entire width of the machine is a smooth metal guide plate 57. This plate extends rearwardly to a point adjacent the ends of the spindles 31. The front of the plate 57 is preferably curved upwardly as indicated at 58. This plate engages the tops of the cotton plants bending them slightly and preventing injury to the same by reason of contact with parts of the machine.

In Figures 8 and 9 I have illustrated a slightly modified form of picker drum. In this form the spindles 31 are rotated by a single segmental rack 51 rigidly fixed to the shaft or axle 14 in the same manner as are the spindle operating members 36. In this modification the inner ends of the spindles 31 are provided with bevel pinions 52 which mesh with bevel pinions 53 carried by longitudinal shafts 54. Each strip 20 has secured thereto one of these longitudinal shafts 54 and in each instance the shaft 54 is mounted on the strip 20 by journal bearings 55, see particularly Figure 9. The end of each shaft 54 adjacent the segmental rack 51 is provided with a spur gear 56. The operation for this form of my invention is obvious. When the drum 18 rotates the spur gears 56 are brought into engagement with the segmental rack 51 during the lower half of their circumferential course and are therefore rotated, which motion is transmitted through the shaft 54 to the bevel pinions 53 carried thereby, consequently rotating bevel pinions 52 and the spindles 31.

The operation of the device described herein is as follows:

The machine is driven along a row of cotton plants, straddling the same in such a manner that the picker drum 18 lies substantially over the cotton plants. Rotation of the traction wheels 12 is transmitted by reason of the clutch 23—24 to the drum 18 which rotates therefore in the same direction. The axle or shaft 14 does not rotate and consequently the spindle operating means 36 which embodies segmental racks 37 remain stationary in the position illustrated in Figure 3. These racks therefore lie in the lower half of the circumferential course of the pinions 32 and the spindles 31.

As the drum is rotated the spindles with their corresponding pinions 32 are brought successively into engagement with the segmental racks 37 and therefore during the latter half of their course are rotated. There is a segmental rack for every two circumferential rows of spindles, the racks being provided with teeth at both sides thereof. Therefore, during the lower half of the course followed by the spindles 31, they are rotated at a rapid speed, this rotation occurring during the time in which they contact with the cotton plants. As the spindles leave the racks their rotation ceases and for the upper half of their course they are not rotated.

Because the spindles 31 have been rotated and in view of the fact that the surface of the spindles is provided with projections, the cotton fiber is stripped from the bolls and wrapped around the spindles. The whirling motion of the spindles causes the fiber to cling tenaciously to them and efficiently strip the cotton plant of all of the cotton fiber.

During continued rotation of the drum 18 the spindles approach the edge of the stripper plate 40, each circumferential row of spindles registering with one of the slots 44 formed in the stripper plate. This stripper plate is so shaped that the slots therein engage the spindles at the base thereof, thereafter during continued rotation of the drum the spindles 31 are carried along through the slots 44 and gradually withdrawn therefrom.

The slots 44 are of such width as to provide only a slight clearance between the spindle and the sides thereof. Consequently as the spindles are withdrawn from the stripper plate the cotton is slid off the free ends of the spindles and the spindles emerge from the stripper plate and again rotate for engagement with the cotton plants. By reason of the fact that the spindles 31 are not rotated during their engagement with the stripper plate, the clearing or removal of the cotton therefrom is facilitated. The cotton stripped from the spindles falls to the lower end of trough 42 from whence it is conveyed by the conveyor belt 64 to the hopper or receptacle 43. The cotton deposited in the hopper 43 may be packed when required by the driver who occupies the seat 50 in a position adjacent this hopper. When the hopper 43 has become filled the contents thereof may be discharged by opening the door 49.

The operation of the modified form of my invention is substantially the same, the spindles 31 being rotated while in engagement with the cotton plants through the medium of the one segmental rack 51, which is engaged successively by spur gears 56 carried on the ends of shafts 54. This engagement causes the rotation of shaft 54 and the consequential rotation of the spindles 31 through the medium of bevel gears 52 and 53.

By forming the drum 18 of strips 20, each carrying a series of spindles 31, broken spindles may be quickly and easily replaced. Should one or more spindles become broken the strip 20 carrying the damaged spindle may be removed by loosening the bolts 21 and another strip or unit placed on the drum. Thus repairs may be made to the device quickly and without much delay.

The speed at which the spindles 31 are rotated may be varied by suitable selection of the segmental racks 37. It is obvious that the drum 18 may be rotated either directly by the traction wheels as illustrated or in any other suitable manner.

It will be apparent that various changes and modifications of the structure illustrated may be resorted to without departing from the spirit and scope of my invention and I particularly reserve this right.

Having thus described my invention, what I claim is:

1. In a cotton picker, the combination with a frame and traction wheels therefor of a rotating drum, means operatable by said traction wheels for rotating said drum, a multiplicity of picker spindles carried by said drum, said picker spindles being arranged in rows longitudinally of said drum, the spindles of each row being staggered relatively to the spindles of the next adjacent row, a multiplicity of segmental racks supported within said drum, said picker spindles projecting into said drum and being provided with pinions, said pinions meshing with said segmental racks during a portion of the rotation of said drum, a stripper plate, said stripper plate being formed with a multiplicity of longitudinal slots, said slots being so positioned as to be in alignment with a circumferential row of picker spindles, said stripper plate being shaped so as to engage the spindles at the base thereof, said spindles not being rotated during their engagement with the stripper plate the spindles being withdrawn from the stripper plate as they travel through the slots formed therein, substantially as and for the purpose described.

2. In a cotton picker, the combination with a frame and traction wheels therefor of a rotating drum, means operatable by said traction wheels for rotating said drum, a multiplicity of picker spindles carried by said drum, a multiplicity of segmental racks supported within said drum, said picked spindles projecting into said drum and being provided with pinions, said pinions meshing with said segmental racks during a portion of the rotation of said drum, a stripper plate extending the width of the machine, said stripper plate being formed with a multiplicity of longitudinal slots, said slots being so positioned as to be in alignment with a circumferential row of picker spindles, said stripper plate being shaped so as to engage the spindles at the base thereof, the spindles being withdrawn from the stripper plate as they travel through the slots formed therein, to discharge the cotton carried thereby and upturned sides on said stripper plate for retaining the cotton thereon, substantially as and for the purpose described.

3. A cotton picker of the class described comprising a frame, a rotating drum, means for rotating said drum, said drum comprising a multiplicity of longitudinal strips, means for removably securing said strips to the frame, a series of picker spindles carried by each strip, means non-rotatably mounted within said drum for revolving said spindles during a portion of the rotation of the drum and a stripper plate for removing the cotton from said picker spindles.

4. A cotton picker of the class described comprising a frame, traction wheels for said frame, a rotating drum, means connecting said drum with said traction wheels for rotation therewith, a multiplicity of radially disposed picker spindles projecting from said drum, means for revolving said spindles during a portion of the rotation of said drum, a curved stripper plate provided with slots adapted to engage said spindles for stripping the cotton therefrom, upturned sides on said stripper plate for retaining the cotton thereon, a receptacle carried by said frame, a trough connecting said receptacle to the stripper plate, an endless conveyor for said trough, and a guide plate secured to said frame and terminating adjacent said picker spindles, all substantially as and for the purpose set forth.

WILLIAM B. EDRINGTON.

Certificate of Correction.

It is hereby certified that in Letters Patent No. 1,465,974, granted August 28, 1923, upon the application of William B. Edrington, of Hollywood, Mississippi, for an improvement in "Cotton-Picking Machines," an error appears in the printed specification requiring correction as follows: Page 4, line 74, claim 2, for the word "discharge" read *disengage;* and that the Letters Patent should be read with this correction therein that the same may conform to the record of the case in the Patent Office.

Signed and sealed this 9th day of October, A. D., 1923.

[SEAL.] 
WM. A. KINNAN,
*Acting Commissioner of Patents.*